US009760105B1

(12) United States Patent
Wang et al.

(10) Patent No.: US 9,760,105 B1
(45) Date of Patent: Sep. 12, 2017

(54) REGULATOR

(71) Applicant: Realtek Semiconductor Corporation, Hsinchu (TW)

(72) Inventors: Shih-Wei Wang, Hualien County (TW); Cheng-Cheng Yen, Hsinchu (TW); Chih-Chien Chang, Taipei (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 15/169,715

(22) Filed: May 31, 2016

(30) Foreign Application Priority Data

Mar. 8, 2016 (TW) .............................. 105107069 A

(51) Int. Cl.
G05F 1/569 (2006.01)
G05F 1/571 (2006.01)
G05G 1/00 (2006.01)
G05F 1/575 (2006.01)
G05F 1/46 (2006.01)
G05F 1/595 (2006.01)
H02H 7/10 (2006.01)

(52) U.S. Cl.
CPC .............. G05F 1/575 (2013.01); G05F 1/468 (2013.01); G05F 1/595 (2013.01); H02H 7/10 (2013.01)

(58) Field of Classification Search
CPC ................................. G05F 1/569; G05F 1/571
USPC .......................... 323/276, 277, 278, 284, 285
See application file for complete search history.

(56) References Cited

U.S. PATENT DOCUMENTS 8,072,198 B2 * 12/2011 Imura ....................... G05F 1/56
323/226
2010/0257383 A1 * 10/2010 Chiu ....................... G05F 1/575
713/300

OTHER PUBLICATIONS

Ka Nang Leung et al., "A Capacitor-Free CMOS Low-Dropout Regulator With Damping-Factor-Control Frequency Compensation," IEEE Journal of Solid-State Circuits, vol. 38, No. 10, Oct. 2003.

* cited by examiner

*Primary Examiner* — Adolf Berhane
*Assistant Examiner* — Gary Nash
(74) *Attorney, Agent, or Firm* — CKC & Partners Co., Ltd.

(57) ABSTRACT

A regulator includes a driving circuit, an amplifying circuit and an overvoltage protection circuit. The driving circuit is configured to receive an input voltage and provide an output voltage through an output terminal. The amplifying circuit is configured to control the driving circuit according to the output voltage. The overvoltage protection circuit is configured to conduct a first current from the output terminal of the overprotection circuit to a ground terminal. When the overvoltage protection circuit detects that a voltage level of a node coupled to the driving circuit is increased, the overvoltage protection circuit conducts a second current from the output terminal of the overprotection circuit to the ground terminal to lower the output voltage, in which the second current is larger than the first current.

20 Claims, 4 Drawing Sheets

REGULATOR

RELATED APPLICATIONS

This application claims priority to Taiwan Application Serial Number 105107069, filed Mar. 8, 2016, which is herein incorporated by reference.

BACKGROUND

Technical Field

The present disclosure relates to a regulator. More particularly, the present disclosure relates to a regulator for preventing output overvoltage.

Description of Related Art

A low dropout regulator (LDO) is widely applied in electronic power supplies, including use in automobile electronics, mobile phones, notebooks. and personal digital assistants (PDA), etc. In particular, the requirements of low power consumption, high performance and high reliability in automobile electronics make design of a LDO circuit more difficult. When power supply output of the LDO circuit switches from a mode to another mode, the load requirement of the LDO changes rapidly, which may result in an output overvoltage or an output undervoltage. Since overvoltage may cause permanent damage to the circuit, a protection mechanism for preventing output overvoltage is very important.

SUMMARY

An aspect of the present disclosure provides a regulator. The regulator includes a driving circuit, an amplifying circuit and an overvoltage protection circuit. The driving circuit is configured to receive an input voltage and provide an output voltage through an output terminal. The amplifying circuit is configured to control the driving circuit according to the output voltage. The overvoltage protection circuit is configured to conduct a first current from the output terminal of the driving circuit to a ground terminal. When the overvoltage protection circuit detects that a voltage level of a node coupled to the driving circuit is increased, the overvoltage protection circuit conducts a second current from the output terminal of the driving circuit to the ground terminal to reduce the output voltage. The second current is larger than the first current.

Another aspect of the present disclosure provides a regulator. The regulator includes a transistor, a driving circuit, an amplifying circuit and a first filter circuit. The transistor has a control terminal, a first terminal and a second terminal. The second terminal is coupled to a ground terminal, and the control terminal is configured to receive a control voltage so that the transistor conducts a first current from the first terminal to the second terminal. The driving circuit has an input terminal, an output terminal and a control terminal. The output terminal is coupled to the first terminal of the transistor, the input terminal is configured to receive an input voltage, and the output terminal is configured to output an output voltage. The amplifying circuit is coupled to the control terminal of the driving circuit and configured to control the driving circuit according to the output voltage. The first filter circuit has a first terminal and a second terminal. The first terminal of the first filter circuit is coupled to the driving circuit, the second terminal of the first filter circuit is coupled to the control terminal of the transistor, and the first filter circuit is configured to control the transistor to conduct a second current from the first terminal to the second terminal to reduce the output voltage when a voltage level at the first terminal is increased. The second current is larger than the first current.

In conclusion, purpose of the present disclosure is to prevent an output overvoltage phenomenon. The regulator of the present disclosure may directly or indirectly detect a voltage level difference that is increased on the output voltage so as to appropriately release excess energy at the output terminal of the driving circuit, and therefore effectively avoid damage caused by the overvoltage phenomenon to circuit.

BRIEF DESCRIPTION OF THE DRAWINGS

The disclosure can be more fully understood by reading the following detailed description of the embodiments, with reference made to the accompanying drawings as follows.

DETAILED DESCRIPTION

Figure 1:
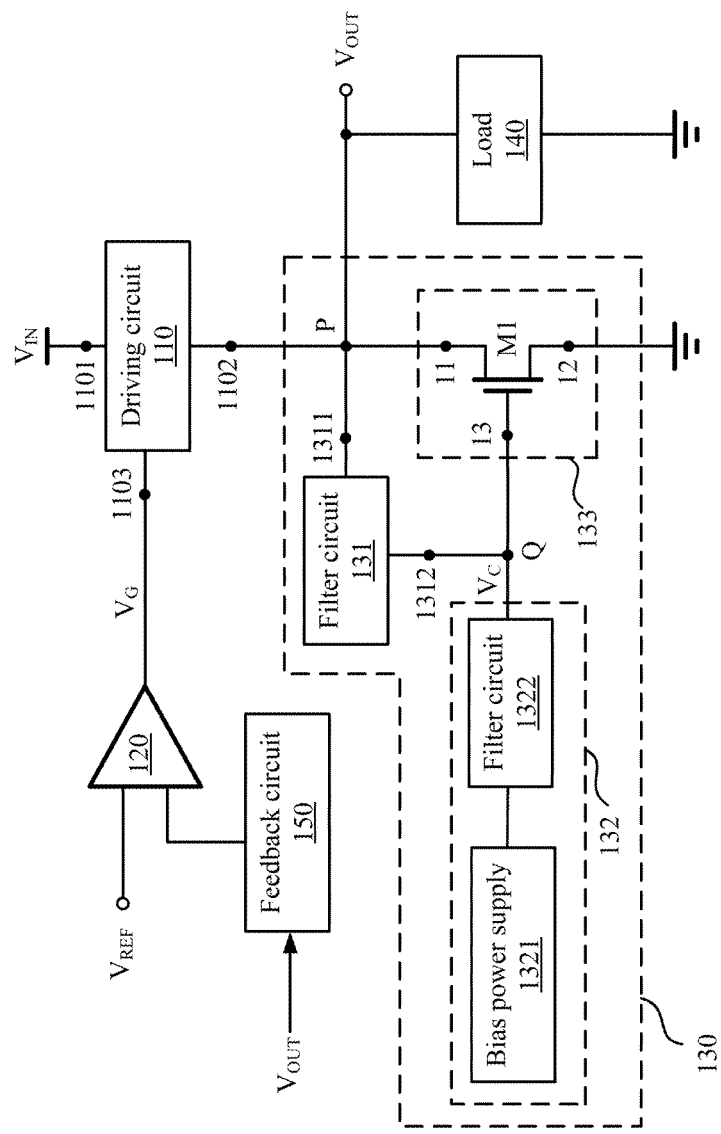
FIG. 1 is a schematic diagram of a regulator according to an embodiment of the present disclosure.

Reference is made in detail to the present embodiments of the disclosure, examples of which are illustrated in the accompanying drawings. Wherever possible, the same reference numbers are used in the drawings and the description to refer to the same or like parts.

In the following description and claims, the terms "coupled" and "connected," along with their derivatives, may be used. In particular embodiments, "connected" and "coupled" may be used to indicate that two or more elements are in direct physical or electrical contact with each other, or may also mean that two or more elements may be in indirect contact with each other. The terms "coupled" and "connected" may still be used to indicate that two or more elements cooperate or interact with each other.

Reference is made to FIG. 1. FIG. 1 is a schematic diagram of a regulator according to an embodiment of the present disclosure. The regulator may be applied to automobile electronics, a mobile phone, a notebook and a personal digital assistant (PDA), and the present disclosure is not limited in this regard.

The regulator includes a driving circuit 110, an amplifying circuit 120 and an overvoltage protection circuit 130. The driving circuit 110 is coupled to the amplifying circuit 120 and the overvoltage protection circuit 130.

The driving circuit 110 is configured to receive an input voltage $V_{IN}$ through an input terminal 1101 and provides an output voltage $V_{OUT}$ to a load 140 through an output terminal 1102.

The amplifying circuit 120 is coupled to a control terminal 1103 of the driving circuit 110 and configured to control the driving circuit 110 according to the output voltage $V_{OUT}$. Specifically, the amplifying circuit 120 is configured to amplify a difference between the feedback voltage and the reference voltage $V_{REF}$ to generate a control voltage $V_G$, in which the control voltage $V_G$ is to control the driving circuit 110 to provide the output voltage $V_{OUT}$. The feedback voltage may be generated by a feedback circuit 150 (e.g., a voltage dividing circuit) that is coupled to the output voltage $V_{OUT}$.

The overvoltage protection circuit 130 is configured to conduct a first current from the output terminal 1102 of the driving circuit 110 to the ground terminal. For example, if a system is affected by a voltage surge, such as from a lightning strike, a voltage level at the output terminal 1102 of the driving circuit 110 is increased, and a voltage level of a node P is also increased. When the overvoltage protection circuit 130 detects that the voltage level at the node P of the driving circuit 110 is increased, the overvoltage protection circuit 130 conducts a second current from the output terminal 1102 of the driving circuit 110 to the ground terminal in order to output voltage to $V_{OUT}$. It should be noted that the second current is larger than the first current so as to effectively prevent an overvoltage phenomenon caused by the increased output voltage $V_{OUT}$. In the present embodiment, the overvoltage protection circuit 130 directly detects the output voltage $V_{OUT}$ (i.e., the voltage level of the node P) to prevent the output voltage $V_{OUT}$ from having the overvoltage phenomenon.

As a result, when the output voltage $V_{OUT}$ is stable without the overvoltage phenomenon, the overvoltage protection circuit 130 conducts a smaller first current between the output terminal of the driving circuit 110 and the ground terminal. When the output voltage $V_{OUT}$ has the overvoltage phenomenon, the overvoltage protection circuit 130 then releases excess energy of the output voltage $V_{OUT}$ through a larger second current to keep the output voltage at $V_{OUT}$ stable.

In some embodiments, the overvoltage protection circuit 130 includes a filter circuit 131, a bias circuit 132 and a switch circuit 133. The filter circuit 131 is configured to control the switch circuit 133 to conduct the second current from the output terminal 1102 of the driving circuit 110 to the ground terminal in order to reduce the output voltage $V_{OUT}$ when the filter circuit detects that the voltage level of the node P is increased. The bias circuit 132 is configured to output a control voltage $V_C$ to a control terminal 13 of the switch circuit 133 so as to control the switch circuit 133 to conduct the first current from the output terminal 1102 of the driving circuit 110 to the ground terminal.

In some embodiments, the bias circuit 132 includes a bias power supply 1321 and a filter circuit 1322. The bias power supply 1321 is configured to provide a bias voltage to the filter circuit 1322. The filter circuit 1322 is configured to receive the bias voltage and output the control voltage $V_C$ to control the switch circuit 133 to conduct the first current from the output terminal 1102 of the driving circuit 110 to the ground terminal. In some embodiments, the filter circuit 1322 may be a low pass filter.

In some embodiments, as shown in FIG. 1, the switch circuit 133 may be implemented as a transistor M1. The transistor M1 has a control terminal 13, a first terminal 11 and a second terminal 12. The second terminal 12 is coupled to the ground terminal, and the control terminal 13 is configured to receive the control voltage $V_C$ so that the transistor M1 conducts the first current from the first terminal 11 to the second terminal 12. The first current is determined according to the control voltage $V_C$. For example, the first current may be a minimum current when the transistor M1 is in a standby state, and the present disclosure is not limited in this regard. In the present embodiment, the filter circuit 131 is a high pass filter, and the filter circuit 1322 is a low pass filter. When the output voltage $V_{OUT}$ has the overvoltage phenomenon, the filter circuit 131 is configured to increase the control voltage $V_C$ by a voltage difference $\Delta V_2$ according to a voltage difference $\Delta V_1$ that is increased at the output terminal 1102 (i.e., node P) of the driving circuit 110. In other words, when the overvoltage phenomenon happens, a voltage level of a node Q is increased to $V_C+\Delta V_2$. The transistor M1 receives $V_C+\Delta V_2$ through control terminal 13 to turn on, and generates the second current according to the voltage level $V_C+\Delta V_2$ of the control terminal 13 to conduct the output terminal 1102 of the driving circuit 110 and the ground terminal in order to release the excess energy of the output voltage $V_{OUT}$. Therefore, the switch circuit 133 effectively solves problem of the overvoltage phenomenon to reduce the output voltage (i.e., node P) to $V_{OUT}$ and to reduce the voltage level of the node Q to $V_C$. Moreover, it should be noted that because the filter circuit 1322 is a low pass filter, and the second current generated by the switch circuit 133 causes the voltage difference $\Delta V_1$ to be rapidly decreased so that the voltage difference $\Delta V_2$ is rapidly decreased, the voltage difference $\Delta V_2$ has no negative effect on the bias circuit 132.

In some embodiments, the voltage difference $\Delta V_1$ is equal to or larger than the voltage difference $\Delta V_2$.

As a result, in a stable state, the transistor M1 is in the standby state that has a rapid response (e.g., increasing the current conducted between the first terminal and the second terminal) according to change at the voltage level of the control terminal 13 in order to release excess energy of the output voltage $V_{OUT}$ and to reduce the lasting time of the overvoltage, which avoids permanent damage to a circuit.

In the present embodiment, the amplifying circuit 120 may be an error amplifier. The transistor M1 may be an N-type metal oxide semiconductor field effect transistor (N-MOSFET), a P-type metal oxide semiconductor field effect transistor (P-MOSFET), a bipolar junction transistor (BJT), or another equivalent transistor, and the present disclosure is not limited in this regard.

Figure 2:
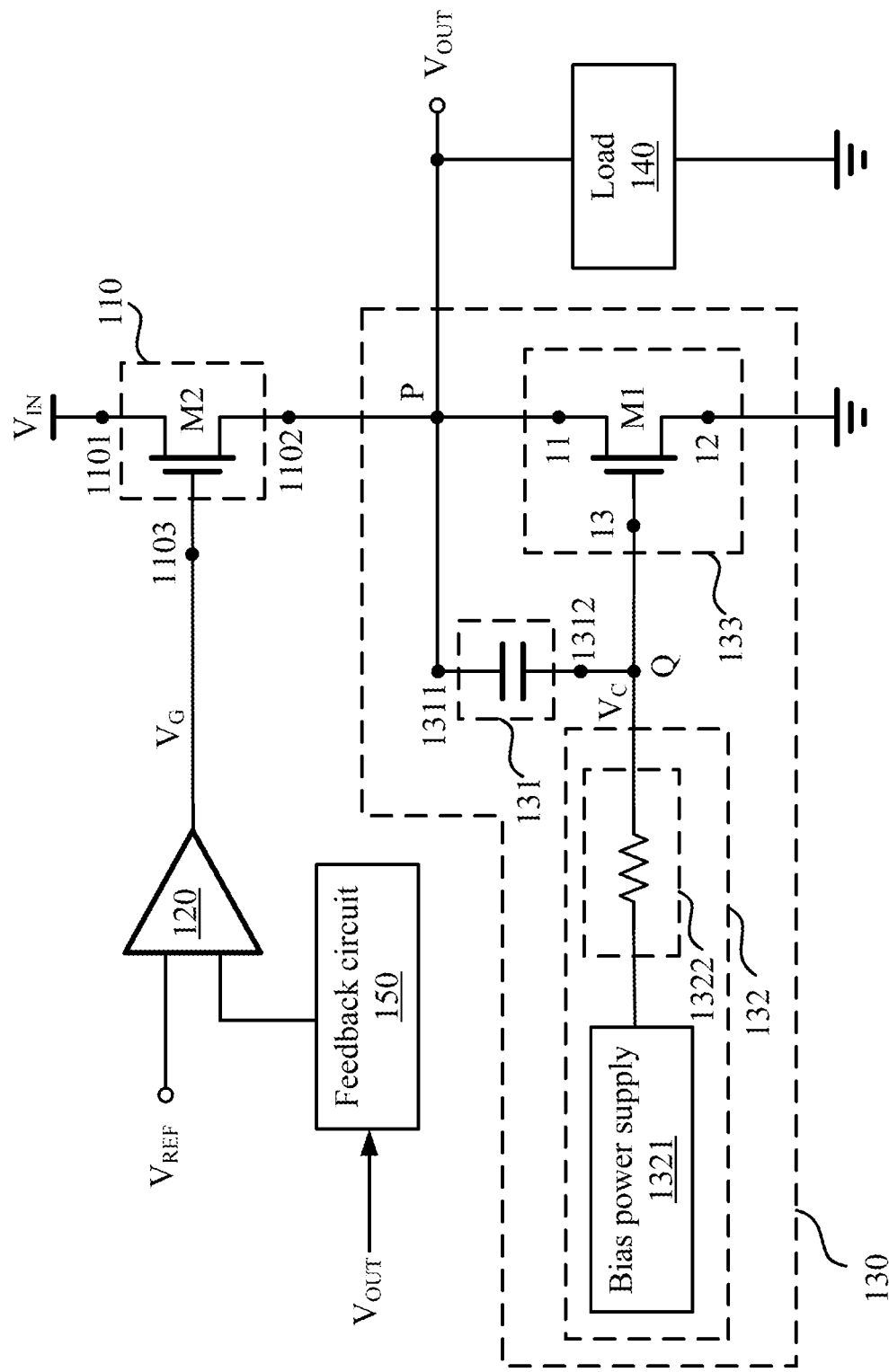
FIG. 2 is a schematic diagram of a regulator according to an embodiment of the present disclosure.

Reference is made to FIG. 2. FIG. 2 is a schematic diagram of a regulator according to an embodiment of the present disclosure. The regulator includes a driving circuit 110, an amplifying circuit 120 and an overvoltage protection circuit 130 as shown in FIG. 1. A switch circuit 133 may be a transistor M1, the driving circuit 110 may be a transistor M2, a filter circuit 131 may be a capacitor, and a filter circuit 1322 may be a resistor. The filter circuit 131 has a first terminal 1311 and a second terminal 1312. The first terminal 1311 is coupled to an output terminal 1102 (i.e., node P) of the driving circuit 110, and the second terminal 1312 is coupled to a control terminal 13 of the transistor M1. The bias power supply 1321 provides a bias voltage to the filter circuit 1322, and the filter circuit 1322 outputs a control voltage $V_C$ to the control terminal 13 of the transistor M1 so that the transistor M1 conducts a first current from the first terminal 11 to the second terminal 12 (i.e., the ground terminal). In the present embodiment, the transistor M2 may be an N-MOSFET, a P-MOSFET, a BJT or another equivalent transistor, and the present disclosure is not limited in this regard.

When the output voltage $V_{OUT}$ is stable without an overvoltage phenomenon, a voltage level of a node Q is the control voltage $V_C$, and the transistor M1 conducts a first current from the first terminal 11 to the second terminal 12. When the output voltage $V_{OUT}$ has the overvoltage phenomenon, the filter circuit 131 couples a voltage difference $\Delta V_1$ that is increased at the first terminal 1311 to the second terminal 1312. In other words, the filter circuit 131 increases a voltage level of the second terminal 1312 by a voltage level difference $\Delta V_2$ according to the voltage difference $\Delta V_1$ that is increased at the first terminal 1311, so the transistor M1 conducts a second current from the first terminal 11 to the second terminal 12 to reduce the output voltage to $V_{OUT}$. As aforementioned, the second current is larger than the first current.

Figure 3:
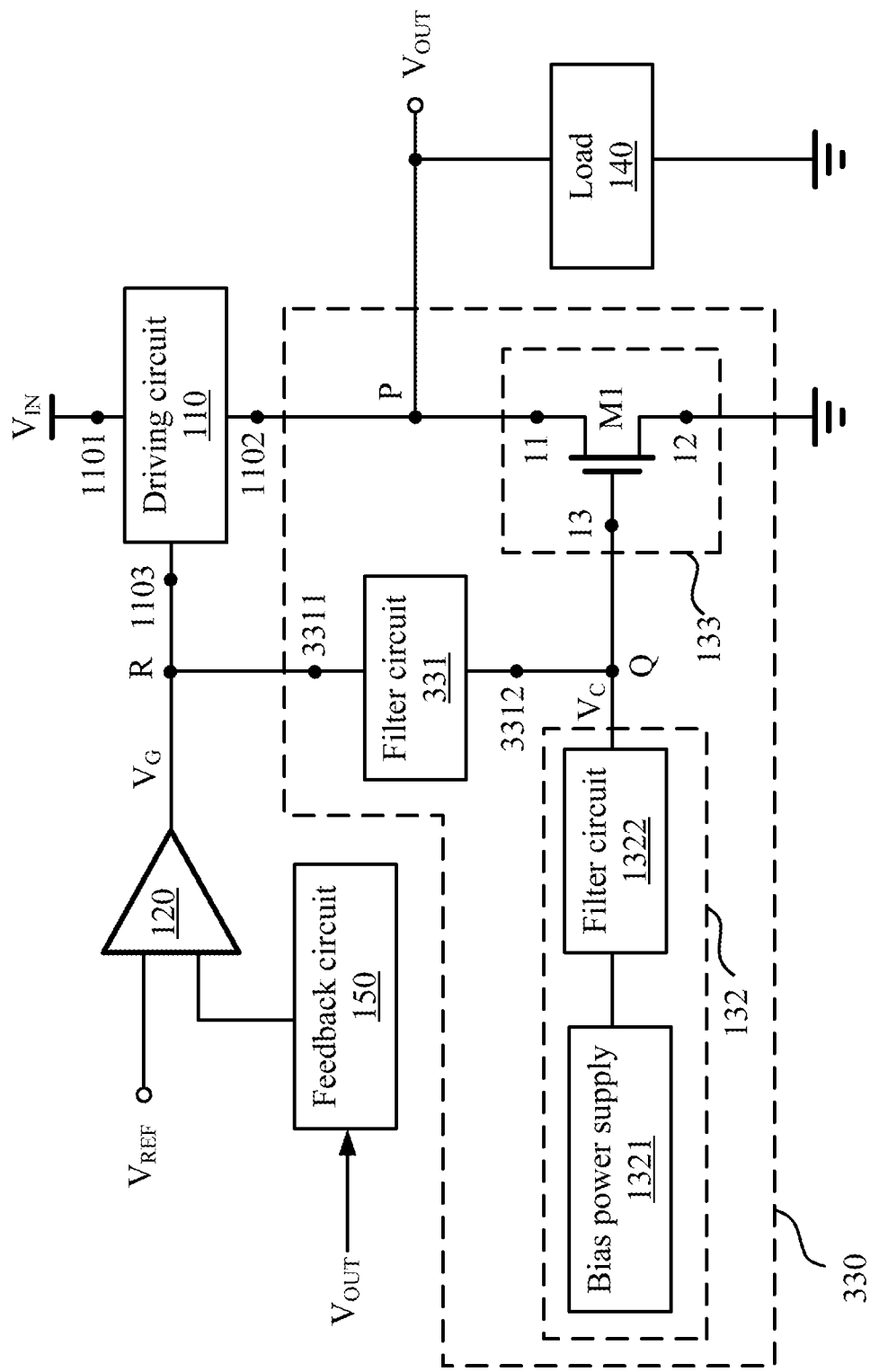
FIG. 3 is a schematic diagram of a regulator according to an embodiment of the present disclosure.

Reference is made to FIG. 3. FIG. 3 is a schematic diagram of a regulator according to an embodiment of the present disclosure. The regulator in FIG. 3 includes a driving circuit 110 and an amplifying circuit 120 as shown in FIG. 1, and an overvoltage protection circuit 330 is coupled to the driving circuit 110 through nodes P and R. Specifically, when the overvoltage phenomenon appears, an increased output voltage $V_{OUT}+\Delta V_1$ causes a voltage level of the node R to be increased to $V_G+\Delta V'$ through a feedback circuit 150 and the amplifying circuit 120. In the present embodiment, the overvoltage protection circuit 130 detects the voltage level of control voltage $V_G$ at the node R (i.e., indirectly detecting the output voltage $V_{OUT}$) to avoid output voltage $V_{OUT}$ having an overvoltage phenomenon.

The regulator shown in FIG. 3 has similar operation as operation of the regulator shown in FIG. 1, and differences are described herein. When the output voltage $V_{OUT}$ has the overvoltage phenomenon, the filter circuit 331 is configured to increase the control voltage $V_C$ by a voltage difference $\Delta V''$ according to a voltage difference $\Delta V'$ that is increased at the control terminal 1103 (i.e., node R) of the driving circuit 110. In other words, when the overvoltage phenomenon appears, a voltage level of a node Q is increased to $V_C+\Delta V''$. The control terminal 13 of the transistor M1 receives the increased control voltage $V_C+\Delta V''$ to turn on, and generates a second current according to the control terminal 13 voltage level $V_C+\Delta V''$ to conduct an output terminal 1102 of the driving circuit 110 and a ground terminal in order to release excess energy of the output voltage $V_{OUT}$. Therefore, the switch circuit 133 effectively solves the overvoltage phenomenon to reduce the voltage level of the node P to $V_{OUT}$ and reduce the voltage level of the node Q to $V_C$.

In some embodiments, the voltage difference $\Delta V'$ is equal to or larger than the voltage difference $\Delta V''$.

Figure 4:
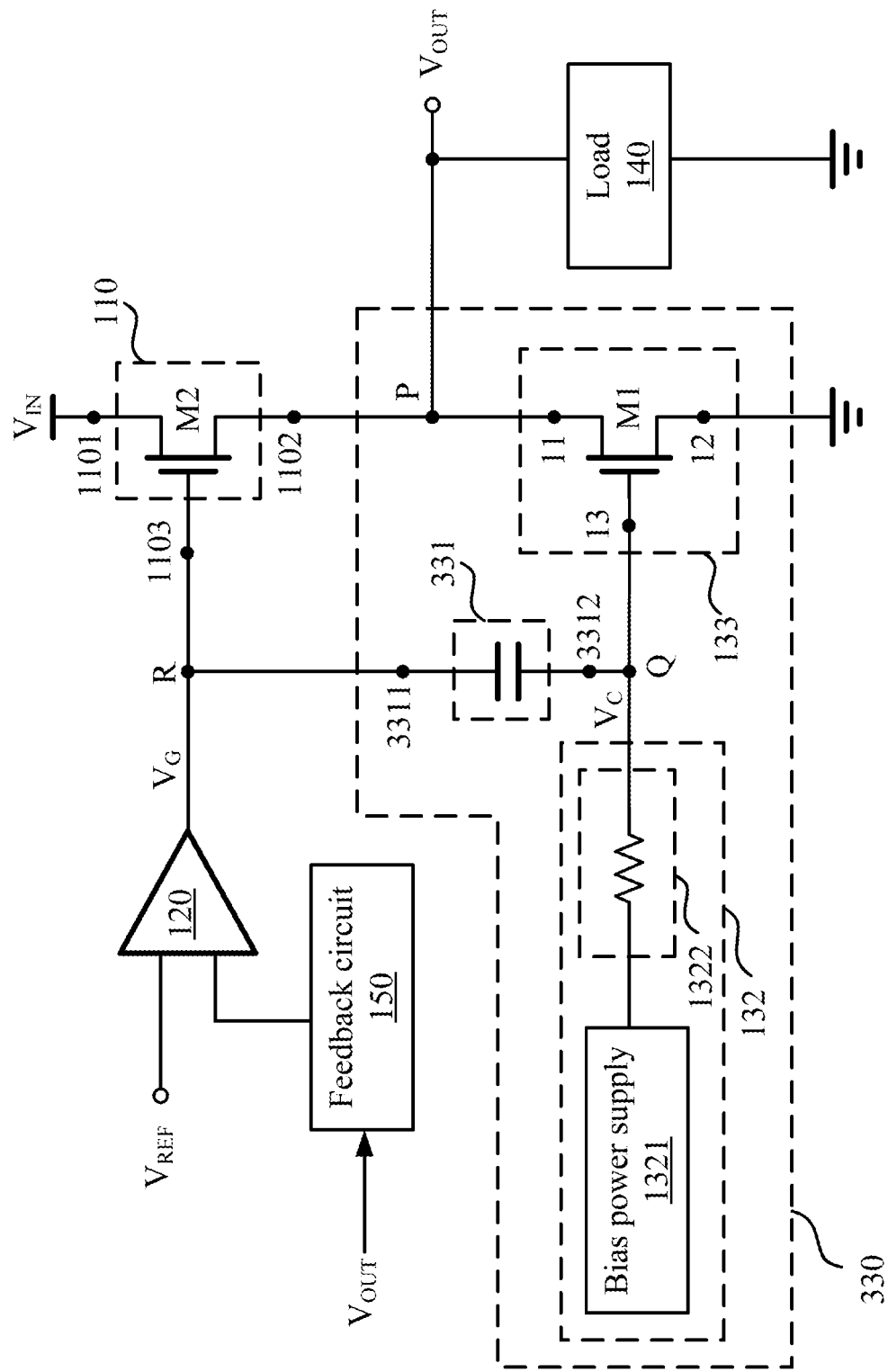
FIG. 4 is a schematic diagram of a regulator according to an embodiment of the present disclosure.

Reference is made to FIG. 4. FIG. 4 is a schematic diagram of a regulator according to an embodiment of the present disclosure. The regulator in FIG. 4 includes a driving circuit 110, an amplifying circuit 120 and an overvoltage protection circuit 330 as shown in FIG. 3. A switch circuit 133 may be a transistor M1, the driving circuit 110 may be a transistor M2, a filter circuit 331 may be a capacitor, and a filter circuit 1322 may be a resistor. The filter circuit 331 has a first terminal 3311 and a second terminal 3312. The first terminal 3311 is coupled to a control terminal 1103 (i.e., node R) of the driving circuit 110, and the second terminal 1312 is coupled to a control terminal 13 of the transistor M1. The bias power supply 1321 provides a bias voltage to the filter circuit 1322, and the filter circuit 1322 outputs a control voltage $V_C$ to the control terminal 13 of the transistor M1 so that the transistor M1 conducts a first current from a first terminal 11 to a second terminal 12 (i.e., the ground terminal).

The regulator shown in FIG. 4 has similar operation as operation of the regulator shown in FIG. 2, and differences are described herein. When output voltage $V_{OUT}$ has the overvoltage phenomenon, the filter circuit 131 couples a voltage difference $\Delta V'$ that is increased at the first terminal 3311 (i.e., node R) to the second terminal 3322. In other words, the filter circuit 331 increases a voltage level of the second terminal 3312 by a voltage level difference $\Delta V''$ according to the voltage difference $\Delta V'$ that is increased at the first terminal 3311 so that the transistor M1 conducts a second current from the first terminal 11 to the second terminal 12 in order to reduce the output voltage to $V_{OUT}$. As aforementioned, the second current is larger than the first current.

It should be noted that the filter circuit 331 may be a capacitor or another high pass filter circuit, filter circuit 1322 may be a resistor or another low pass filter circuit, and the present disclosure is not limited in this regard.

In conclusion, the present disclosure provides a regulator that prevents output voltage from overvoltage phenomenon. The regulator of the present disclosure may directly or indirectly detect a voltage level difference that is increased on the output voltage so as to appropriately release excess energy at the output terminal of the driving circuit, and therefore effectively avoid damage caused by the overvoltage phenomenon to the circuit.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A regulator, comprising:
   a driving circuit, configured to receive an input voltage and provide an output voltage through an output terminal;
   an amplifying circuit, configured to control the driving circuit according to the output voltage; and
   an overvoltage protection circuit, configured to conduct a first current from the output terminal of the driving circuit to a ground terminal;
   wherein when the overvoltage protection circuit detects that a voltage level of a node coupled to the driving circuit is increased, the overvoltage protection circuit conducts a second current from the output terminal of the driving circuit to the ground terminal to reduce the output voltage, and the second current is larger than the first current.

2. The regulator of claim 1, wherein the overvoltage protection circuit comprises:
   a switch circuit; and
   a first filter circuit, configured to control the switch circuit to conduct the second current from the output terminal of the driving circuit to the ground terminal to reduce the output voltage when detecting that the voltage level of the node is increased.

3. The regulator of claim 2, further comprising:
   a bias circuit, configured to output a control voltage to a control terminal of the switch circuit to control the switch circuit to conduct the first current from the output terminal of the driving circuit to the ground terminal according to a bias voltage, wherein the first current is determined according to the control voltage.

4. The regulator of claim 3, wherein the bias circuit comprises:
   a bias power supply, configured to provide the bias voltage; and
   a second filter circuit, configured to receive the bias voltage and output the control voltage to control the switch circuit to conduct the first current from the output terminal of the driving circuit to the ground terminal.

5. The regulator of claim 4, wherein the second filter circuit is a low pass filter.

6. The regulator of claim 4, wherein the first filter circuit comprises a capacitor, and the second filter circuit comprises a resistor.

7. The regulator of claim 2, wherein the first filter circuit is a high pass filter.

8. The regulator of claim 2, wherein the node is the output terminal of the driving circuit, the first filter circuit is further configured to increase the control voltage by a second voltage difference according to a first voltage difference that is increased at the output terminal of the driving circuit, and the second current is determined according to the control voltage and the second voltage difference.

9. The regulator of claim 2, wherein the node is one of an output terminal of the amplifying circuit and a control terminal of the driving circuit, the first filter circuit is configured to increase the control voltage by a second voltage difference according to a first voltage difference that is increased at the node, and the second current is determined according to the control voltage and the second voltage difference.

10. The regulator of claim 1, wherein the amplifying circuit is configured to amplify a difference between a feedback voltage and a reference voltage to control the driving circuit, and the feedback voltage corresponds to the output voltage.

11. A regulator, comprising:
a transistor, having a control terminal, a first terminal and a second terminal, wherein the second terminal is coupled to a ground terminal, the control terminal is configured to receive a control voltage so that the transistor conducts a first current from the first terminal to the second terminal;
a driving circuit, having an input terminal, an output terminal and a control terminal, wherein the output terminal is coupled to the first terminal of the transistor, the input terminal is configured to receive an input voltage, and the output terminal is configured to output an output voltage;
an amplifying circuit, coupled to the control terminal of the driving circuit and configured to control the driving circuit according to the output voltage; and
a first filter circuit, having a first terminal and a second terminal, wherein the first terminal of the first filter circuit is coupled to the driving circuit, the second terminal of the first filter circuit is coupled to the control terminal of the transistor, the first filter circuit is configured to control the transistor to conduct a second current from the first terminal to the second terminal to reduce the output voltage when a voltage level at the first terminal is increased, and the second current is larger than the first current.

12. The regulator of claim 11, wherein the first filter circuit is further configured to increase a voltage difference at the second terminal of the first filter circuit according to the voltage difference that is increased at the first terminal of the first filter circuit so that the transistor conducts the second current from the first terminal of the transistor to the second terminal of the transistor to reduce the output voltage.

13. The regulator of claim 11, further comprising:
a bias circuit, coupled to the control terminal of the transistor and configured to output the control voltage to the control terminal of the transistor according to a bias voltage so that the transistor conducts the first current from the first terminal of the transistor to the second terminal of the transistor, wherein the first current is determined according to the control voltage.

14. The regulator of claim 13, wherein the bias circuit further comprises:
a bias power supply, configured to provide the bias voltage; and
a second filter circuit, coupled to the bias power supply and the control terminal of the transistor and configured to receive the bias voltage and output the control voltage to the control terminal of the transistor so that the transistor conducts the first current from the first terminal of the transistor to the second terminal of the transistor.

15. The regulator of claim 14, wherein the second filter circuit is a low pass filter.

16. The regulator of claim 14, wherein the first filter circuit comprises a capacitor, and the second filter circuit comprises a resistor.

17. The regulator of claim 11, wherein the first filter circuit is a high pass filter.

18. The regulator of claim 11, wherein the first terminal of the first filter circuit is coupled to the output terminal of the driving circuit, the first filter circuit is further configured to increase a voltage level of the second terminal of the first filter circuit by a second voltage difference according to a first voltage difference that is increased at the first terminal of the first filter circuit, and the second current is determined according to the control voltage and the second voltage difference.

19. The regulator of claim 11, wherein the first terminal of the first filter circuit is coupled to an output terminal of the amplifying circuit or the control terminal of the driving circuit, the first filter circuit is further configured to increase a voltage level of the second terminal of the first filter circuit by a second voltage difference according to a first voltage difference that is increased at the first terminal of the first filter circuit, and the second current is determined according to the control voltage and the second voltage difference.

20. The regulator of claim 11, wherein the amplifying circuit is configured to amplify a difference between a feedback voltage and a reference voltage to control the driving circuit, and the feedback voltage corresponds to the output voltage.

* * * * *